No. 803,207. PATENTED OCT. 31, 1905.
G. A. WINKLER & H. BACH.
MACHINE FOR PRODUCING PLASTER HOLDING FABRICS.
APPLICATION FILED DEC. 29, 1904.
3 SHEETS—SHEET 1.
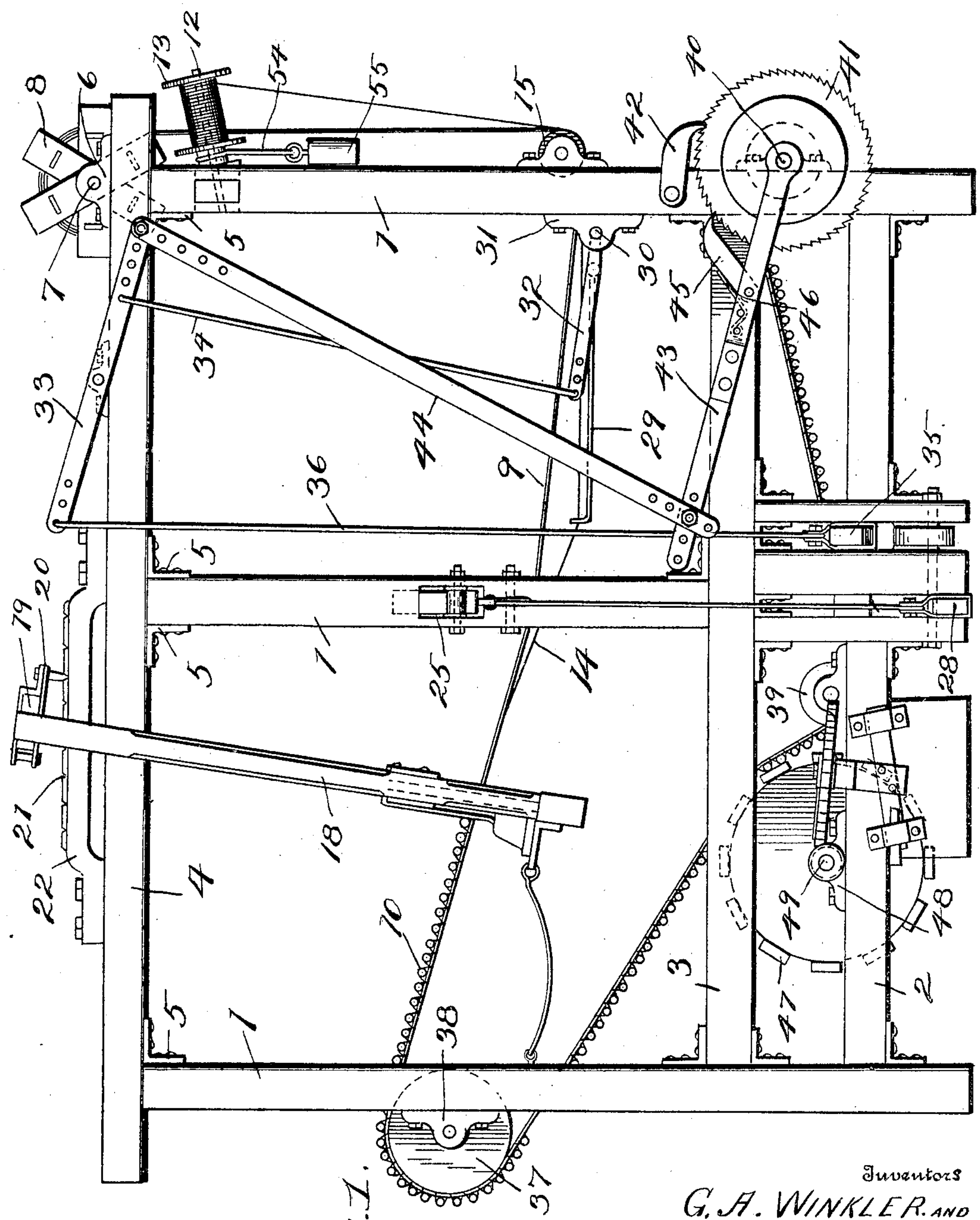
Fig. I.
Witnesses
W. R. Taylor.
S. W. FitzGerald
Inventors
G. A. WINKLER. AND
H. BACH.
By W. T. FitzGerald & Co
Attorneys No. 803,207. PATENTED OCT. 31, 1905.
G. A. WINKLER & H. BACH.
MACHINE FOR PRODUCING PLASTER HOLDING FABRICS.
APPLICATION FILED DEC. 29, 1904.
3 SHEETS—SHEET 2.
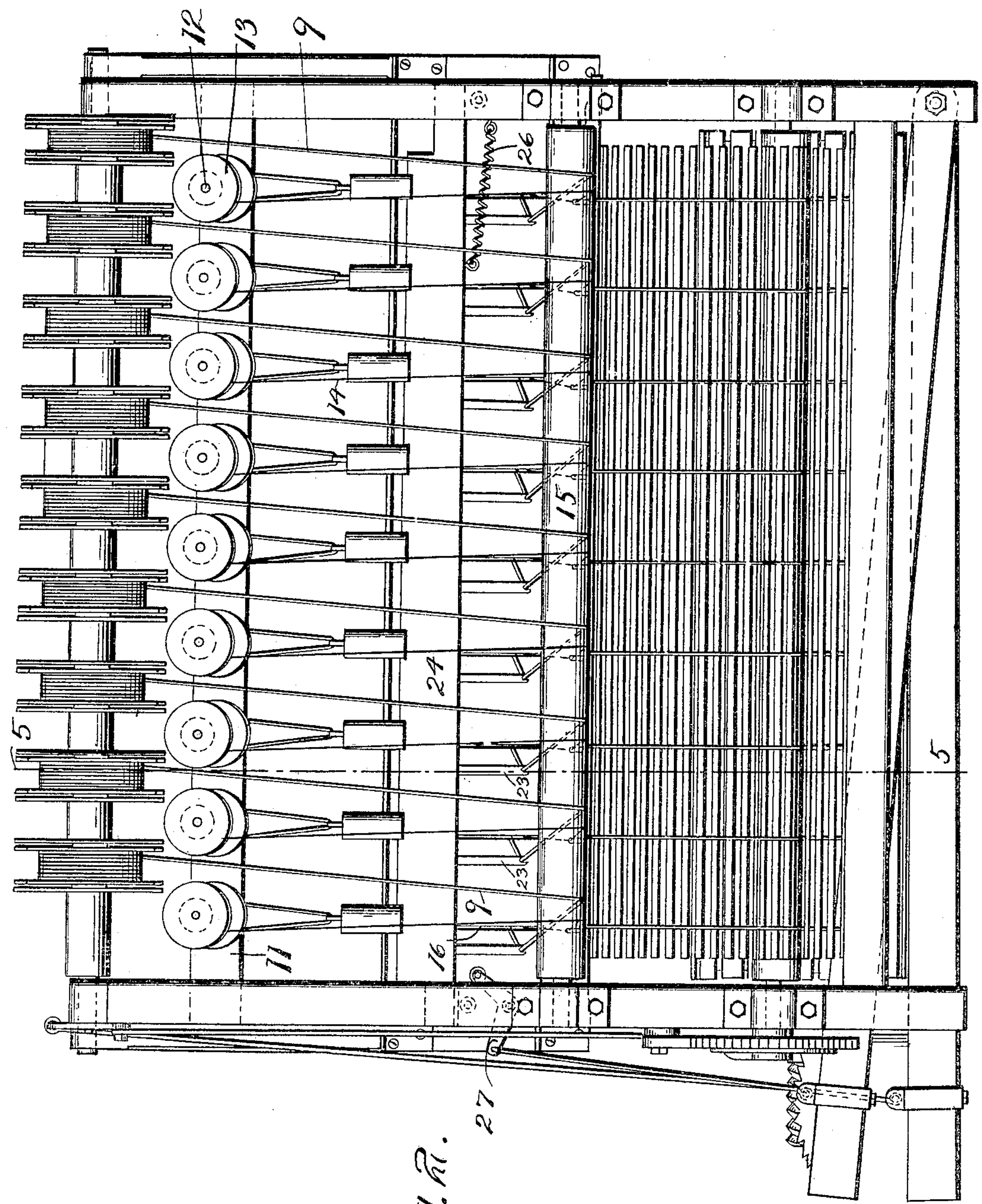
Witnesses
W. R. Taylor.
S. W. FitzGerald
Inventors
G. A. WINKLER. AND
H. BACH.
By W. T. FitzGerald & Co
Attorneys No. 803,207. PATENTED OCT. 31, 1905.
G. A. WINKLER & H. BACH.
MACHINE FOR PRODUCING PLASTER HOLDING FABRICS.
APPLICATION FILED DEC. 29, 1904.
3 SHEETS—SHEET 3.
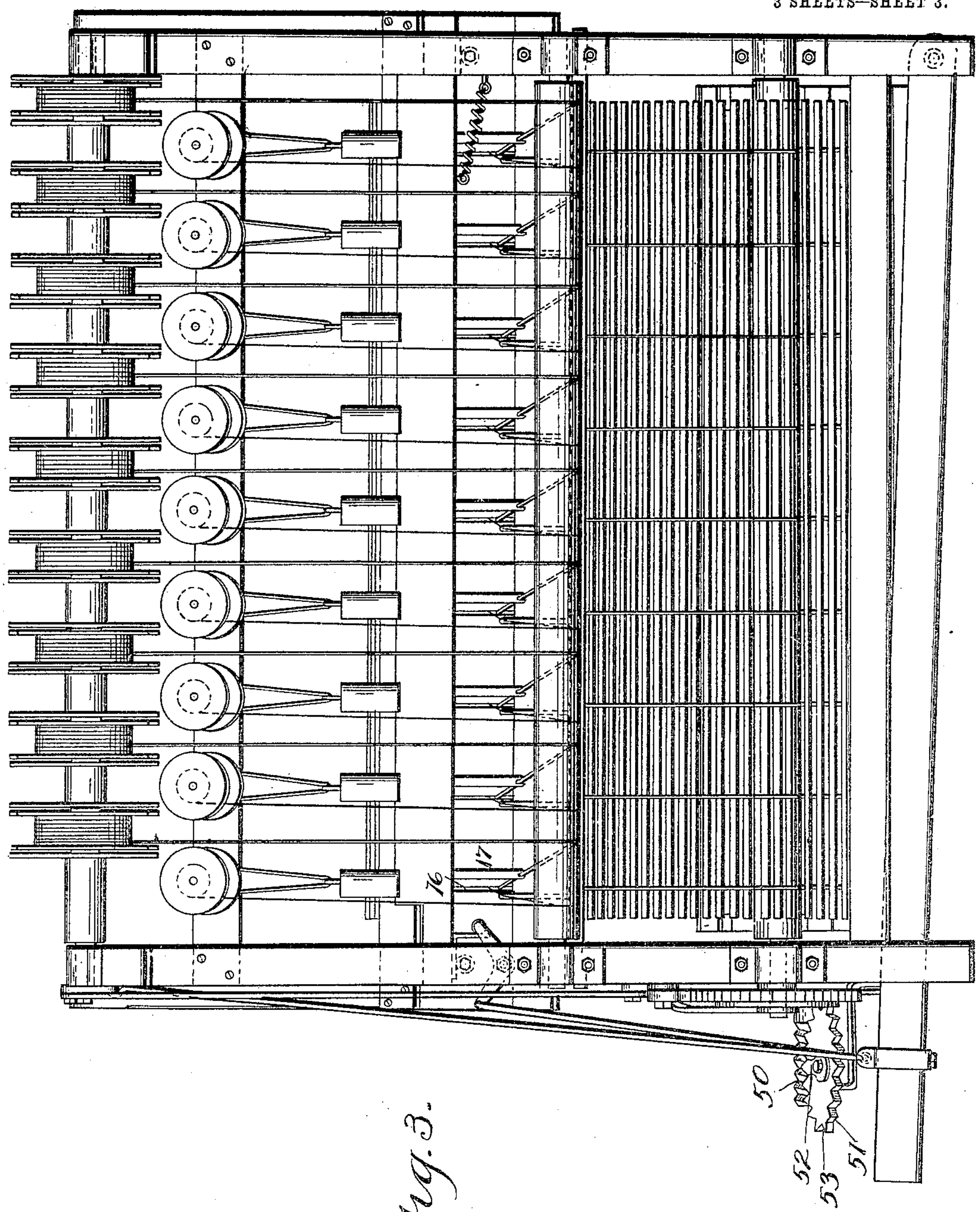
Witnesses
W. R. Taylor.
S. E. Fitzgerald
Inventors
G. A. WINKLER. AND.
H. BACH.
By W. T. Fitzgerald & Co.
Attorneys

UNITED STATES PATENT OFFICE.

GUSTAV A. WINKLER AND HERMAN BACH, OF WEST HAMMOND, ILLINOIS.

MACHINE FOR PRODUCING PLASTER-HOLDING FABRICS.

No. 803,207. Specification of Letters Patent. Patented Oct. 31, 1905.

Application filed December 29, 1904. Serial No. 238,842.

*To all whom it may concern:*

Be it known that we, GUSTAV A. WINKLER and HERMAN BACH, citizens of the United States, residing at West Hammond, in the county of Cook and State of Illinois, have invented certain new and useful Improvements in Machines for Producing Plaster-Holding Fabric; and we do hereby declare the following to be a full, clear, and exact description of the invention, such as will enable others skilled in the art to which it appertains to make and use the same.

Our invention relates to a plaster-holding fabric and mechanism for producing the same, whereby a plurality of tubular lathing will be produced, the result being the attainment of a maximum amount of air-space in the plastered wall; and our invention consists of certain novel features of combination and construction of parts, the preferred form whereof will be hereinafter clearly set forth, and pointed out in the claim.

The main object of our invention, among others, is to provide reliably-efficient mechanism whereby lathing material may be produced in quantities at a minimum price.

Other objects and advantages will be hereinafter made clearly apparent from the following specification, considered in connection with the accompanying drawings, which are made a part of this application, and in which—

Figure 1 is a side elevation of our invention. Fig. 2 is an end view thereof; and Fig. 3 is a view similar to Fig. 2, showing both the operating or controlling levers in a lowered position.

For convenience of description the various details of our invention and coöperating accessories will be designated by reference-numerals, the same numeral applying to similar parts throughout the several views.

In carrying out our invention we first provide a suitable framework consisting of the uprights 1, the base members 2 and 3, and the top sections 4, there being any desired number of said parts deemed necessary in producing a strong rigid framework upon which the operating mechanism is disposed, it being understood that said uprights and cross-beams may be connected together in any desired way, as by mortise and tenons or by angle-plates 5, as deemed most desirable. Upon the framework thus or otherwise constructed we mount in suitable bearings 6 the shaft 7, upon which we locate a plurality of wire-holding reels 8, designed to hold the coarser wire 9, employed by us in holding a plurality of cross-bars 10, which are preferably sections of cane of suitable size and hollow, whereby a tubular lathing will be the result. It will be understood, however, that the members 10 may be of any material, as ordinary lathing or metallic rods, though if metal is employed we prefer to form them tubular, so that the continuously-hollow space will be provided. Upon the cross-beam 11 we provide a plurality of outwardly-projecting pins 12, upon each of which we dispose the spool 13 for the smaller wires 14, which are to be incorporated with the larger wire 9 and with the cross bars or members 10, as will be clearly obvious. The coarser and finer wires 9 and 14, respectively, are first directed downward around the guiding-roller 15 and are thence disposed through the slotted openings 16 in the swinging beam 17, which is supported by the arms 18, reaching upward through the framework and having upon their upper ends the arms 19, each arm being provided with a finger 20, designed to take into one of a plurality of recesses 21 in the supporting-bracket 22, as clearly shown in Figs. 1 and 2. The object in providing the fingers 20 is to reduce friction to a minimum, as will be obvious.

The larger wires 9 are mounted in slots formed in the ends of fingers 23, said fingers 23 being carried by the controlling-bar 24, having its ends mounted in slots or guideways 25 in the middle uprights 1. Said bar 24 is drawn normally to one side of the machine by the spring 26 or equivalent thereof and may be drawn longitudinally against the tension of the spring by the bell-crank 27, mounted on middle upright 1 at a contiguous point and connected with the foot-lever 28. The object in giving an endwise mount to the bar 24 is to draw the main wires 9 either to the right or to the left, incident to the weaving process, so that the small wires will wrap partly around the main wire in a manner hereinafter particularly explained—that is to say, the smaller wires 14 are first extended downward from the spools 13 and thence around the roller 15 and thence through the controlling fingers or needles 29, there being a needle for each of said wires. The needles 29 are carried by the crank-shaft 30, mounted in bearings 31 in the end sections 1, as clearly shown in Figs. 2 and 5.

The crank-shaft 30 is provided with the controlling arm or extension 32, and said arm is connected to an operating-lever 33 by means of the link member 34, while said lever 33 is controlled by the foot lever or bar 35 through the mediation of the link or connecting-rod 36, as clearly shown in Fig. 2 and other views. It therefore follows that when the foot-lever 35 is pressed downward the arm 32 will be correspondingly moved and the needles 29 simultaneously raised, bringing the smaller wires 14 above the larger wires 9, whereby a space is formed for the insertion of a small cane, rod, lath, or the like employed in making the webbing. When the cane, rod, or the like has been inserted, the swinging beam is moved sharply against it to drive and hold it tightly in the angle formed by the two wires. The foot is then removed from the lever 35, which causes the needles 29 to drop below the larger wires. The lever 28 is then pressed down, causing the heavy needles 23 to move laterally, after which the other lever 35 is again pressed downward. The swinging beam is then permitted to move backward into its normal position ready for the insertion of a second section of cane or the like, and after such insertion the swinging-beam is then moved upward close to the newly-inserted cane. The lever 35 is then released, causing the needles 29 to drop, and the lever 28 is released, and spring 26 acts upon the bar 24 and moves it laterally and incidentally moves all of the coarser wires controlled by the members 23 to a few inches of one side of their former position, the result being that the smaller wire is wrapped around the inserted cane and also under and over the coarser wire ready for the next cane. Both the finer and coarser wires are extended around the drum 37 in suitable bearings 38 in the framework, when said wires, together with the interwoven cane or other form of tubular lathing, are passed downward under the guiding-roller 39 and thence to the winding-drum upon the shaft 40, a suitable take-up mechanism being provided to actuate said shaft—as, for instance, the ratchet-wheel 41 and the detent 42, said ratchet-wheel 41 being actuated by the controlling-lever 43, placed in communication with the lever 33 by the bar 44, as clearly shown in Fig. 2.

The bar or lever 43 is provided with the detent 45, and said detent is held in engagement with the ratchet-wheel by a suitable spring 46 or the equivalent thereof.

We have also provided means for measurement of the quantity of webbing manufactured by our machine, consisting in the drum-like member 47, mounted in bearings 48 on the horizontal bars 2 of the framework. The outer end of the shaft 49, upon which the drum 47 is mounted, is provided with a worm 50, placed in mesh with the gear-wheel 51, said gear-wheel being provided with a plurality of graduations. Designed to coöperate with the graduations upon the wheel 51 is the index-finger 52, held stationary by a stud or bolt 53, passing through the center of the wheel 51 and holding the same rotatably mounted in position. By noting the number to which the finger 52 may be pointing the operator may readily determine the quantity of material produced, inasmuch as the size of the drum 47 is such that one rotation thereof will measure, for instance, one yard, it being understood that other plans may be adopted to accomplish the same result. The several spools 13 are held against casually unwinding by a loop 54, passing loosely around the extension of the spool, the lower end of the loop being provided with a weight 55, as clearly shown. In like manner any suitable device may be provided for holding the spools or reels 8 against undue movement, thereby keeping the coarser wires taut and holding them against entanglement.

By mounting the needles 29 on a crank-shaft 30 they can be quickly lowered, because such movement will be assisted by the weight of the crank-shaft.

The various parts of our invention may be very cheaply and expeditiously manufactured and readily assembled each in its respective operative position, and while we have described the preferred combination and construction of elements we desire to comprehend in this application all substantial equivalents and substitutes falling fairly within the scope of our invention.

Having thus fully described our invention, what we claim as new, and desire to secure by Letters Patent, is—

In a machine of the character described the combination with a frame; of a crank-shaft journaled therein, a series of parallel needles extending from the shaft and having apertured extensions at an angle to the free ends thereof, take-up mechanism, means for partly rotating the crank-shaft and operating the take-up mechanism simultaneously, a swinging beam extending transversely in the frame, a transversely-extending bar in the frame, slotted fingers depending from the bar, and means for moving the fingers laterally.

In testimony whereof we have signed our names to this specification in the presence of two subscribing witnesses.

GUSTAV A. WINKLER.
HERMAN BACH.

Witnesses:
HENRY SCHAU,
HENRY BLIRRMER.